ns Patent Number: 4,960,636

Date of Patent: Oct. 2, 1990

United States Patent [19]
Tomitaka et al.

[54] BIAXIALLY ORIENTED POLYESTER FILM FOR FLOPPY DISK

[75] Inventors: Kichinojo Tomitaka, Yokohama; Shigeo Utsumi, Yamato; Masumi Koizumi, Kawasaki, all of Japan

[73] Assignee: Diafoil Company, Limited, Tokyo, Japan

[21] Appl. No.: 497,914

[22] Filed: Mar. 23, 1990

[30] Foreign Application Priority Data

Apr. 13, 1989 [JP] Japan ................................. 64-94146

[51] Int. Cl.$^5$ ...................... C08G 63/02; C08G 63/22; B32B 3/02
[52] U.S. Cl. ...................................... 428/220; 428/64; 528/272; 528/298; 528/302; 528/308.2; 264/288.4; 264/290.2
[58] Field of Search ................... 428/220, 64; 528/272, 528/298, 302, 308.2; 264/288.4, 290.2

[56] References Cited

U.S. PATENT DOCUMENTS 4,861,860  8/1989  Ohishi et al. .................... 528/272
4,866,158  9/1989  Kubo et al. ...................... 528/272

*Primary Examiner*—Morton Foelak
*Attorney, Agent, or Firm*—Oblon, Spivak, McClelland, Maier & Neustadt

[57] ABSTRACT

A biaxially oriented polyester film for floppy disks which has an in-plane thermal expansion coefficient ($\alpha_\gamma$) of $(1.7\pm0.8)\times10^{-5}$/°C. and a shrinkage of not more than 0.03% after 72-hour treatment under the conditions of 60° C. and 80% RH, and which simultaneously satisfies the following relationships (1) to (6):

$$1.492 \leq n\alpha \leq 1.505 \tag{1}$$

$$0.160 \leq \Delta P \leq 0.168 \tag{2}$$

$$1.605 \leq \bar{n} \leq 1.609 \tag{3}$$

$$5 \leq X_I \leq 15 \tag{4}$$

$$60 \leq X_{100} \leq 68 \tag{5}$$

$$1.395 \leq \rho \leq 1.405 \tag{6}$$

wherein $n\alpha$ represents the refractive index of the film in the direction of the thickness, $\Delta P$ the degree of planar orientation, $n$ the average refractive index, $X_I$ the X-ray diffraction peak ratio, $X_{100}$ the crystal size (A) in the (100) face, and $\rho$ the density.

2 Claims, No Drawings

BIAXIALLY ORIENTED POLYESTER FILM FOR FLOPPY DISK

BACKGROUND OF THE INVENTION

The present invention relates to a biaxially oriented polyester film for floppy disks which is excellent in dimensional stability and flatness.

A polyester film is used for various purposes and it is especially suitable as a base film for a floppy disk.

With the increasing demand for higher-density disks, a base film for a floppy disk has been required to reduce the dimensional change of the recording medium in a severe environment. To meet such demand, a method of producing a polyester film by the relaxation and heat treatment of a biaxially oriented and heatset film in the off-line is generally adopted to reduce the dimensional change of a polyester film (e.g., Japanese Patent Publication No. 10769/1983, and Japanese Patent Publication Nos. 15927/1982 and 127233/1984).

Although this method can produce a film with a small dimensional change, the low productive efficiency such as workability disadvantageously leads to rise in cost. In addition, the flatness of the film is lowered. Thus, the improvement of this method is demanded.

SUMMARY OF THE INVENTION

Accordingly, it is an object of the present invention to eliminate the above-described problems in the prior art and to provide a biaxially oriented polyester film for floppy disks which has an in-plane thermal expansion coefficient $(\alpha_\gamma)$ of $(1.7\pm0.8)\times10^{-5}/°$ C. and a shrinkage of not more than 0.03% after 72-hour treatment under the conditions of 60° C. and 80% RH, and which simultaneously satisfies the following relationships (1) to (6):

$$1.492 \leq n\alpha \leq 1.505... \quad (1)$$

$$0.160 \leq \Delta P \leq 0.168... \quad (2)$$

$$1.605 \leq \bar{n} \leq 1.609... \quad (3)$$

$$5 \leq X_I \leq 15... \quad (4)$$

$$60 \leq X_{100} \leq 68... \quad (5)$$

$$1.395 \leq \rho \leq 1.405... \quad (6)$$

wherein $n\alpha$ represents the refractive index of the film in the direction of the thickness, $\Delta P$ the degree of planar orientation, n the average refractive index, $X_I$ the X-ray diffraction peak ratio, $X_{100}$ the crystal size (A) in the (100) face, and $\rho$ the density.

DESCRIPTION OF THE PREFERRED EMBODIMENT

"Polyester" in the present invention refers to a crystalline aromatic polyester obtained by the polycondensation of an aromatic dicarboxylic acid such as terephthalic acid, isophthalic acid and naphthalene-2,6-dicarboxylic acid or an ester thereof with a diol such as ethylene glycol, diethylene glycol and neopentyl glycol. Such a polyester is obtained not only by the direct polycondensation of an aromatic dicarboxylic acid and a glycol but also by other methods such as the polycondensation of an aromatic dicarboxylic acid with a glycol after ester exchange and the polycondensation of the diglycol ester of an aromatic dicarboxylic acid or the like.

Such polymers are represented by polyethylene terephthalate, polyethylene-2,6-naphthalate, polytetramethylene terephthalate and polytetramethylene-2,6-naphthalate. For example, polyethylene terephthalate and polyethylene-2,6-naphthalate are not only polyesters having terephthalic acid and naphthalene-2,6-dicarboxylic acid, respectively, combined with ethylene glycol, but also polyester copolymers in which not less than 80 mol% of the repeating units is ethylene terephthalate and ethylene-2,6-naphthalate, respectively, and not more than 20 mol% of the repeating units is another component, or mixed polyesters obtained by mixing another polymer with the respective polyesters.

In the polyester of the present invention, since too low a degree of polymerization lowers the mechanical properties, the intrinsic viscosity of the polyester is not less than 0.40, preferably 0.50 to 0.90, more preferably 0.55 to 0.85.

It is possible to add fine particles in order to provide a slippery. Examples of fine particles providing a slippery are known inert external particles such as kaolin, clay, calcium carbonate, titanium oxide and silicon oxide.

The thermal expansion coefficient $(\alpha_\gamma)$ in the film plane in a given direction must be $(1.7\pm0.8)\times10^{-5}/°$ C., preferably $(1.7\pm0.3)\times10^{-5}/°$ C. In a film which does not satisfy this condition, the difference in the thermal expansion coefficient between the film and the head becomes so large that it is difficult to increase the track density. Such a film is unsuitable for high-density floppy disks.

The film of the present invention is required to have a shrinkage of not more than 0.03% in any direction in a plane after being held at a the temperature of 60° C. and a relative humidity of 80%. A film which does not satisfy this condition is inferior in the dimensional stability and it is impossible to increase the track density.

The film of the present invention must satisfy all the following conditions as well as the above-described shrinkage and expansion properties.

The refractive index $(n\alpha)$ of the film of the present invention in direction of the thickness must be in the range of 1.492 to 1.505. If $n\alpha$ is less than 1.492, the dimensional stability of the film is inappropriately inferior. On the other hand, in a film having no exceeding 1.505, the strength of the film is unfavorably too much lowered. $n\alpha$ is preferably 1.492 to 1.499, more preferably 1.492 to 1.496.

The degree of planar orientation $(\Delta P)$ of the film of the present invention is in the range of 0.160 to 0.168. A film having $\Delta P$ exceeding 0.168 and a film having $\Delta P$ of less than 0.160 are both unsuitable due to the inferior dimensional stability and the insufficient strength, respectively. $\Delta P$ is preferably 0.164 to 0.168, more preferably 0.165 to 0.168.

The average refractive index $(\bar{n})$ of the film must be in the range of 1.605 to 1.609. A film having n of less than 1.605 and a film having n exceeding 1.609 are both unsuitable due to the inferior dimensional stability and the easiness to break, respectively. $\bar{n}$ is preferably in the range of 1.605 to 1.607.

In the present invention, $X_I$ is the ratio of the peak value of the (110) face measured by X-ray diffractometry. [I(110) to the peak vale of the (100) face [100]], which represents the degree of planar orientation of the film must be in the range of 5 to 15%. A film having $X_I$ of less than 5% and a film having $X_I$ exceeding 15% are both unsuitable due to the inferior dimensional stability and the insufficient strength, respectively. $X_I$ is preferably 5 to 10%, more preferably 5 to 8%.

The crystal size ($X_{100}$) of the (100) face of the film of the present invention is in the range of 60 to 68 Å. A film having $X_{100}$ of less than 60 Å and a film having $X_{100}$ exceeding 68 Å are both unsuitable due to the inferior dimensional stability and the insufficient strength and flatness, respectively. $X_{100}$ is preferably in the range of 60 to 65Å A.

The density of the film of the present invention is in the range of 1.395 to 1.405, preferably 1.395 to 1.400. A film having a density of less than 1.395 and a film having a density exceeding 1.405 are both unsuitable due to the inferior dimensional stability and the insufficient flatness and strength, respectively.

Since the film of the present invention aims at high-density floppy disks, the surface roughness (Ra) thereof is preferably not more than 0.015 μm, more preferably not more than 0.010 μm, especially, not more than 0.008 μm. A film having Ra exceeding 0.015 μm is unsuitable due to the inferior magnetic density.

A biaxially oriented and heatset film satisfying all the above-described physical properties are suitable as a base film for high-density floppy disks.

The process for producing the film of the present invention will be explained in the following, but the process is not limited to the following example and modification is possible within the scope of the present invention.

A polyester with fine particles such as kaolin, titanium μm oxide, silica, calcium carbonate and aluminum oxide added thereto together with a stabilizer, a coloring agent, an antifoamer, an organic lubricant, etc., if necessary, is dried by an ordinary means, extruded by an extruder and cooled and solidified by a rotary cooling device, thereby forming an unstretched sheet. The ordinary electrostatic pinning method is preferably adopted for this process. After sufficient preheat of the thus-obtained film, the film is stretched by one- or multi-stage stretching in the machine direction at a stretching ratio of 2.8 to 5.8 times at a film temperature of 85° to 130° C. so that the birefringence after stretching is not more than 0.080, preferably not more than 0.065, more preferably not more than 0.050. The film is then stretched in the transverse direction at a stretching ratio of 3.0 to 4.5 times at a film temperature of 90° to 120° C. and is heatset at 220° to 260° C. During heatsetting, the film is generally relaxed in the transverse direction by 2 to 15%. It is preferable to relax the heatset film in the machine and/or transverse direction in a cooling zone.

The thickness of a polyester film of the present invention is not specified, but the thickness of the film used is usually 25 to 100 μm.

The present invention will be explained in more detail with reference to the following example, but it is to be understood that the example is for the purpose of illustration only and is not intended as definition of the limits of the invention. The properties of the film were evaluated as follows:

(1) Refractive index $n\alpha$ in the direction of the thickness of the film

The refractive index of the film in the direction of the thickness with respect to the sodium D-lines at 23° C. was measured by using an Abbe refractometer produced by Atago Kogakusha.

(2) Degree of planar orientation (ΔP)

The maximum refractive index $n\gamma$ in the film plane, the refractive index $n\beta$ in the orthogonal direction thereto, and the refractive index $n\alpha$ in the direction of the thickness of the film were measured by using an Abbe refractometer produced by Atago Kogakusha. The degree of planar orientation was calculated from the following equation. The refractive indexes were measured by using the sodium D-lines at 23° C.

$$\text{Degree of planer orientation } (\Delta P) = \frac{(n\gamma + n\beta)}{2} - n\alpha$$

(3) Average refractive index $\bar{n}$

The maximum refractive index $n\gamma$ in the film plane, the refractive index $n\beta$ in the orthogonal direction thereto, and the refractive index $n\alpha$ in the direction of the thickness of the film were measured by using an Abbe refractometer produced by Atago Kogakusha. The average refractive index was calculated from the following equation. The refractive indexes were measured by using the sodium D-lines at 23° C.

$\bar{n} = \frac{1}{3}(n\alpha + n\beta + n\gamma)$ (4) X-ray diffraction peak ratio ($X_I$)

The peak value of the face (110) in the vicinity of $2\Theta = 26°$ and the peak value of the face ($\overline{1}10$) in the vicinity of $2\Theta = 23°$ in a film-shaped sample were measured by an X-ray automatic diffractometer, and the ratio of these peak values was obtained.

(5) X-ray crystal size $X_{100}$ of the (100) face

The half-width of the (100) face was obtained by using an X-ray diffractometer and the crystal size was calculated from the following equation.

$$X_{100} = \frac{0.9 \cdot \lambda}{B \cdot \cos \theta}$$

$\lambda = 2.2896$ (Å)
B = half width (radian)

The straight line between the points representing the scattering intensities $2\Theta = 33°$ and $2\Theta = 19°$ was considered to be a base line.

The output of the X-rays was 30 kV, 15 mA.

(6) Thermal expansion coefficient $\alpha_\gamma$

A tension of 27 g/mm² was applied to a sample film of 12.2 mm wide and 250 mm long (in the direction of measurement) by using a constant-load extensometer (Model/TL2) produced by Nippon Jido Seigyosha, and the temperature was raised at a rate of 15° C./min. Two points at 30° to 50° C. was combined by a straight line in the temperature•elongation graph and the gradient thereof was obtained.

As a result of measurements at intervals of 10° extending over 180°, the directions in which the minimum value and the maximum value of the expansion coefficient were the direction of main orientation (direction of $\gamma$) in the film plane and the direction (direction of $\beta$) orthogonal to the direction of $\gamma$, respectively, in any sample. Therefore, the thermal coefficient expansions were thereafter measured only in the directions of $\gamma$ and $\beta$.

(7) Dimensional change with temperature and humidity

A sample of 10 mm wide and 50 mm long (in the direction of measurement) was cut out, and the sample was cut into two halves in the longitudinal direction. One half was left with both end portions free in an oven maintained at 60° C. and 80% RH for 72 hours. The thus-treated sample and the untreated sample were brought into close contact with each other and the relative deviations of both end portions were measured through a microscope. The directions in which the maximum value and the minimum value of the values measured at intervals of 10° in the film plane were obtained corresponded to the machine direction and the transverse direction of the film, respectively.

(8) Evaluation on suitability for floppy disks

A magnetic layer was applied to both surfaces of the film of the present invention by an ordinary method and the film was subjected to calender treatment so as to produce 3.5-inch floppy disks. The thus-obtained floppy disks were treated at 60° C. and 80% RH for 72 hours and various properties such as modulation were measured. Good floppy disks were marked with O, bad ones with x and intermediate ones with Δ in Table 2.

EXAMPLE 1

A polyester containing 0.33 wt% of spherical silica (average particle diameter: 0.3 μm) was dried, extruded, cooled and solidified by an ordinary method, thereby obtaining an unstretched film. The thus-obtained film was sufficiently preheated at 100° C. and first stretched in the machine direction by 2.25 times at 90° C., and further by 1.2 times while maintaining the film temperature at 90° C. The film was then stretched in the transverse direction by 3.8 times at 110° C. Thereafter it was heatset at 237° C. and relaxed in the transverse direction by 5% at 230° C. The film was further relaxed in the transverse direction by 2% in the cooling zone of 180° C and the drawing speed was reduced by 0.01 m/min so as to also relax the film in the machine direction. Thus, a biaxially oriented film of 75 μm thick was obtained.

COMPARATIVE EXAMPLE 1

The unstretched film obtained in Example 1 was used and stretched in the machine direction by 3.7 times at 87° C. and in the transverse direction by 3.8 times at 100° C. The thus-stretched film was heatset at 232° C. to obtain a film of 75 μm thick.

COMPARATIVE EXAMPLE 2

The film obtained in Comparative Example 1 was heat treated at 150° C. for 25 seconds while unwinding it.

COMPARATIVE EXAMPLES 3 to 5

Film-forming conditions in Example 1 were varied so as to obtain films having various physical properties shown in Tables 1 and 2 and evaluated on the suitability for floppy disks.

The results obtained in Example and Comparative Examples are collectively shown in Tables 1 and 2.

TABLE 1

| | Thermal expansion coefficient $\alpha_\gamma$ ($\cdot 10^5/°C.$) | | Dimensional change with temperature and humidity (%) | | | Degree of planar orientation |
|---|---|---|---|---|---|---|
| | Direction of $\gamma$ | Direction of $\beta$ | Machine direction | Transverse direction | $n\alpha$ in the direction of thickness | $\Delta P$ |
| Ex. 1 | 1.5 | 1.5 | 0.025 | 0.000 | 1.495 | 0.166 |
| Comp. Ex. 1 | 1.2 | 1.2 | 0.065 | 0.065 | 1.398 | 0.170 |
| Comp. Ex. 2 | 1.2 | 1.2 | 0.010 | 0.010 | 1.398 | 0.170 |
| Comp. Ex. 3 | 1.1 | 2.7 | 0.032 | 0.000 | 1.492 | 0.170 |
| Comp. Ex. 4 | 1.0 | 2.0 | 0.144 | 0.037 | 1.397 | 0.171 |
| Comp. Ex. 5 | 0.8 | 1.0 | 0.166 | 0.005 | 1.494 | 0.164 |

TABLE 2

| | Average refractive index $\bar{n}$ | X-ray diffraction peak ratio $X_I$ (%) | Crystal size in the (100) face $X_{100}$ Å | Density $\rho$ (g · cm³) | Evaluation on suitability for floppy disk |
|---|---|---|---|---|---|
| Ex. 1 | 1.6055 | 6.2 | 63 | 1.397 | O |
| Comp. Ex. 1 | 1.6042 | 3.0 | 56 | 1.392 | x |
| Comp. Ex. 2 | 1.6042 | 3.0 | 56 | 1.392 | x |
| Comp. Ex. 3 | 1.6073 | 3.8 | 72 | 1.403 | x |
| Comp. Ex. 4 | 1.6048 | 3.6 | 65 | 1.398 | x |
| Comp. Ex. 5 | 1.6022 | 6.7 | 52 | 1.390 | x |

What is claimed is:

1. A biaxially oriented polyester film for floppy disks which has an in-plane thermal expansion coefficient ($\alpha_\gamma$) of $(1.7\pm0.8)\times10-5/°$ C. and a shrinkage of not more than 0.03% after 72-hour treatment under the conditions of 60° C. and 80% RH, and which simultaneously satisfies the following relationships (1) to (6):

$$1.492 \leq n\alpha \leq 1.505... \quad (1)$$

$$0.160 \leq \Delta P \leq 0.168... \quad (2)$$

$$1.605 \leq \bar{n} \leq 1.609... \quad (3)$$

$$5 \leq X_I \leq 15... \quad (4)$$

$$60 \leq X_{100} \leq 68 \quad (5)$$

$$1.395 \leq \rho \leq 1.405 \quad (6)$$

wherein nα represents the refractive index of the film in the direction of the thickness, ΔP the degree of planar orientation, n the average refractive index, $X_I$ the X-ray diffraction peak ratio, $X_{100}$ the crystal size (A) in the face (100), and ρ the density.

2. The biaxially oriented polyester film according to claim 1, wherein the thickness of said film is 25 to 100 μm.

* * * * *